(12) United States Patent
Addis (10) Patent No.: US 7,226,054 B2
(45) Date of Patent: Jun. 5, 2007

(54) CLAMP LOCK BRUSH SEAL ASSEMBLY

(75) Inventor: Mark E. Addis, Kennebunk, ME (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 11/011,230

(22) Filed: Dec. 14, 2004

(65) Prior Publication Data

US 2006/0125190 A1 Jun. 15, 2006

(51) Int. Cl.
*F01D 11/02* (2006.01)
*F16J 15/44* (2006.01)

(52) U.S. Cl. .................................... 277/355
(58) Field of Classification Search .............. 277/355
See application file for complete search history.

(56) References Cited

U.S. PATENT DOCUMENTS

| | | | |
|---|---|---|---|
| 885,032 A | 4/1908 | De Ferranti | |
| 4,781,388 A | 11/1988 | Wohrl et al. | |
| 4,957,301 A | 9/1990 | Clay, Jr. et al. | |
| 5,066,024 A | 11/1991 | Reisinger et al. | |
| 5,066,025 A | 11/1991 | Hanrahan | |
| 5,090,710 A | 2/1992 | Flower | |
| 5,106,104 A | 4/1992 | Atkinson et al. | |
| 5,114,159 A | 5/1992 | Baird et al. | |
| 5,135,237 A | 8/1992 | Flower | |
| 5,316,318 A | 5/1994 | Beau | |
| 5,425,543 A * | 6/1995 | Buckshaw et al. | 277/350 |
| 5,630,590 A * | 5/1997 | Bouchard et al. | 277/301 |
| 5,678,898 A | 10/1997 | Bagepalli et al. | |
| 5,704,760 A * | 1/1998 | Bouchard et al. | 415/170.1 |
| 5,961,279 A * | 10/1999 | Ingistov | 415/170.1 |
| 5,975,535 A | 11/1999 | Gail et al. | |
| 6,196,550 B1 | 3/2001 | Arora et al. | |
| 6,257,588 B1 | 7/2001 | Bagepalli et al. | |
| 6,293,553 B1 | 9/2001 | Werner et al. | |
| 6,302,400 B1 | 10/2001 | Werner et al. | |
| 6,308,958 B1 * | 10/2001 | Turnquist et al. | 277/355 |
| 6,328,311 B1 | 12/2001 | Plona et al. | |
| 6,331,006 B1 | 12/2001 | Baily et al. | |
| 6,378,873 B1 | 4/2002 | Mayer et al. | |
| 6,390,476 B1 * | 5/2002 | Tong et al. | 277/355 |
| 6,536,773 B2 | 3/2003 | Datta | |
| 6,622,490 B2 * | 9/2003 | Ingistov | 60/782 |
| 6,685,190 B1 * | 2/2004 | Mayer et al. | 277/355 |
| 2002/0130469 A1 * | 9/2002 | Kono | 277/355 |
| 2003/0160392 A1 | 8/2003 | Szymbor et al. | |
| 2003/0178778 A1 * | 9/2003 | Szymbor et al. | 277/355 |
| 2003/0201608 A1 * | 10/2003 | Addis | 277/355 |
| 2004/0007822 A1 * | 1/2004 | Mortzheim | 277/355 |
| 2004/0084849 A1 * | 5/2004 | Walcott et al. | 277/355 |

FOREIGN PATENT DOCUMENTS

EP 0 357 536 7/1990

(Continued)

*Primary Examiner*—Patricia Engle
*Assistant Examiner*—Jonathan Liu
(74) *Attorney, Agent, or Firm*—Marjama & Bilinski LLP (57) ABSTRACT

A brush seal assembly which includes a brush seal which is bristle hoop positioned between two plates. A segmented ring is positioned in contact with the brush seal and provides a uniform clamping force against the seal to hold it in place within a support member.

17 Claims, 7 Drawing Sheets

FOREIGN PATENT DOCUMENTS

| | | | | | |
|---|---|---|---|---|---|
| EP | 0 992 721 | 12/2000 | GB | 2 191 825 | 12/1987 |
| EP | 1375983 | 1/2004 | WO | 9906673 | 11/1999 |

* cited by examiner

CLAMP LOCK BRUSH SEAL ASSEMBLY

FIELD OF THE INVENTION

This invention relates generally to brush seals and more specifically to a brush seal assembly.

BACKGROUND OF THE INVENTION

Brush seals are commonly used on various applications, including gas turbine engines. The brush seal is typically used to prevent secondary flow in the engine from escaping through a gap between a stationary part such as a diffuser case and a rotating part (e.g. a turbine shaft). Brush seals may also have other uses, such as sealing a gap between stationary parts of the engine.

A brush seal typically includes packs of wire bristles sandwiched between plates. The bristle packs and plates are typically welded together to form the brush seal. The brush seal must undergo heat treatment after the welding step to relieve any residual stresses. Heat treatment typically involves securing the brush seal within a fixture, then placing the fixture in an oven. The heat treatment process is time consuming and can be expensive.

The welding step transforms the discrete sub-assemblies of the brush seal into one piece. The one-piece arrangement prevents the removal of a sub-assembly without affecting or damaging the remainder of the brush seal. This means a mechanic must replace the entire brush seal during maintenance. Replacement of the entire brush seal must occur despite the fact that only one of the sub-assemblies (typically the bristle packs) needs replacement.

The bristle packs of the brush seal are expensive. The main factor influencing cost is the amount of raw material used. Each individual bristle in the bristle pack is a taken from a length of wire. A commonly used wire is a 0.002", 0.003", 0.004 or 0.006" diameter cobalt alloy wire. One type of bristle pack can have approximately 5000 bristles per linear inch. This type of bristle pack clearly contains a large amount of wire. When used in a 12" outer diameter single stage brush seal, this type of bristle pack can contain approximately 2.6 miles of wire.

It is therefore an object of the present invention to provide a new and improved brush seal.

It is a further object of the present invention to provide a brush seal which can be readily disassembled.

It is a further object of the present invention to provide for a brush seal assembly which requires no welding together of the seal assembly components.

It is a further object of the present invention to produce a brush seal at a reduced cost.

SUMMARY OF THE INVENTION

The invention relates to a "loose brush seal" in the form of a no-weld assembly. A split segmented clamping retaining ring and clamping bolts are used to "load" the seal and ensure that it remains fixed in place in a support structure for the seal. For purposes of this invention, and as will be shown in detail hereinafter, the term loose brush seal means that the various components of the brush seal are discrete and are not welded together except for the conventional bristle hoop component.

The support is provided with a location which allows for adequate clearance of a retention lip on the retaining ring to allow for radial installation of the retaining ring. Clamping bolts are used to ensure uniform clamping forces. The sideplate of the brush seal can contain recessed holes or turned diameter to accept the clamping bolts. Because the seal can be readily disassembled, it is an advantageous configuration for test engines and rigs. The design makes it easy to test various brush materials, wire sizes, bore sizes, etc. which results in a significant cost savings. The brush seal design of the present invention can be readily disassembled and repaired in the field with a minimum of tools. In addition, seals using non-weldable plate materials can benefit from this configuration.

BRIEF DESCRIPTION OF THE DRAWINGS

For a further understanding of these and objects of the invention, reference will be made to the following detailed description of the invention which is to be read in connection with the accompanying drawings, where.

DETAILED DESCRIPTION OF THE INVENTION

Figure 1:
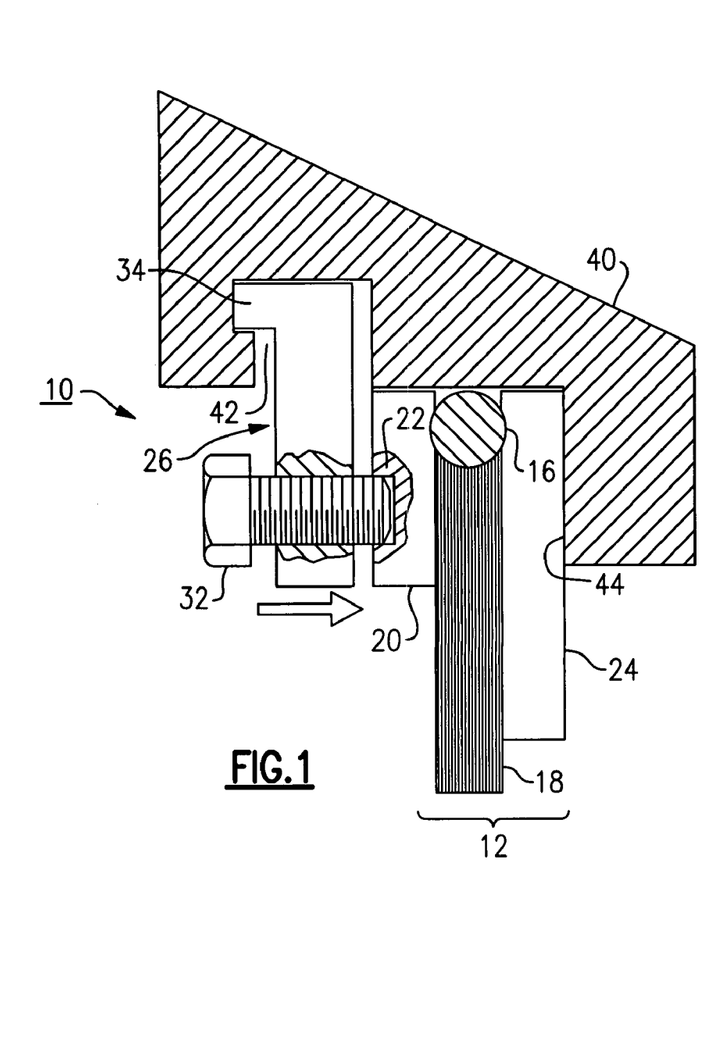
FIG. 1 is a side sectional view of one embodiment of a seal assembly of the present invention.

FIG. 1 illustrates one embodiment of a brush seal assembly 10 of the present invention held in a support member or housing 40. The brush seal assembly 10 is made up of a brush seal 12 and a segmented or split clamping retaining ring 26.

The brush seal 12 includes a welded bristle hoop 14 having a weld 16 which holds a plurality of bristles in the form of a bristle pack 18 in place. A side plate 20 and backplate 24 sandwich the bristle hoop. The two plates and bristle hoop are loose and not welded together. The following United States Patent Application Publications: US 2003/0160392 A1; US 2003/017878A1 and US 2003/017877A1, herein incorporated by reference, describe the manufacture and assembly of such a brush seal in greater detail. The plates 20, 24 and bristle pack 18 are positioned as shown in FIG. 1 against a backface 44 of support member 40 and held in place by the clamping force of retention ring 26. More specifically the retaining ring 26 is split or segmented at 28 in a plurality of locations to allow radial installation of the ring in support member 40. The retaining ring 26 can have a retention lip 34 which allows it to be held in place in a slot 42 of support member 40. The retaining ring further contains a plurality of fasteners, such as clamping bolts 32, which function to "load" the brush seal and hold it in place. The sideplate 20 could have a plurality of recesses 22 to accept the clamping bolts and when the bolts are tightened, ensure a uniform clamping force on the brush seal components to hold the brush seal in place. The recesses are primarily intended to position or "lock" the clamping ring. The location and number of the clamping bolts allow for the uniform clamping force. In another embodiment, using small, individual clamps, proper clocking becomes necessary for uniform compression of the assembly. Proper axial location of recesses is also required of the linear design using multiple, individual clamps.

Figure 2:
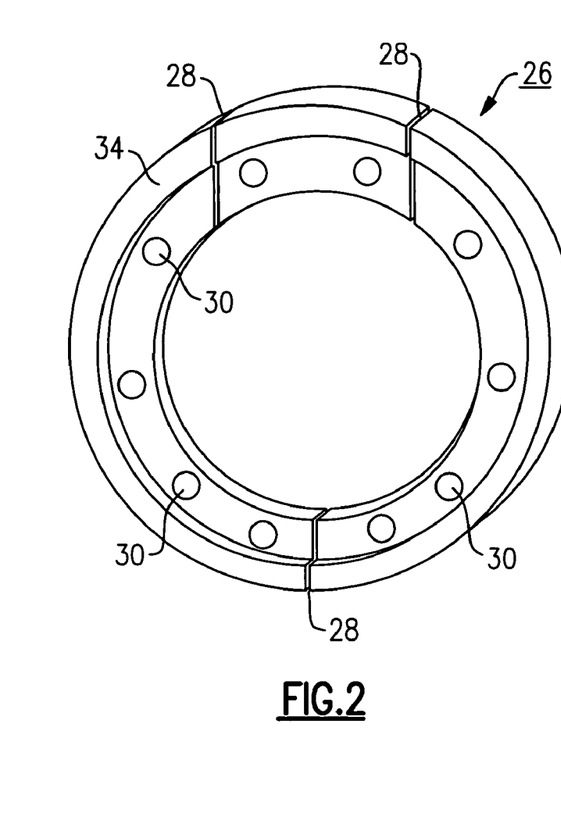
FIG. 2 is a perspective view of the segmented retaining ring of the seal assembly of FIG. 1.
Figure 3:
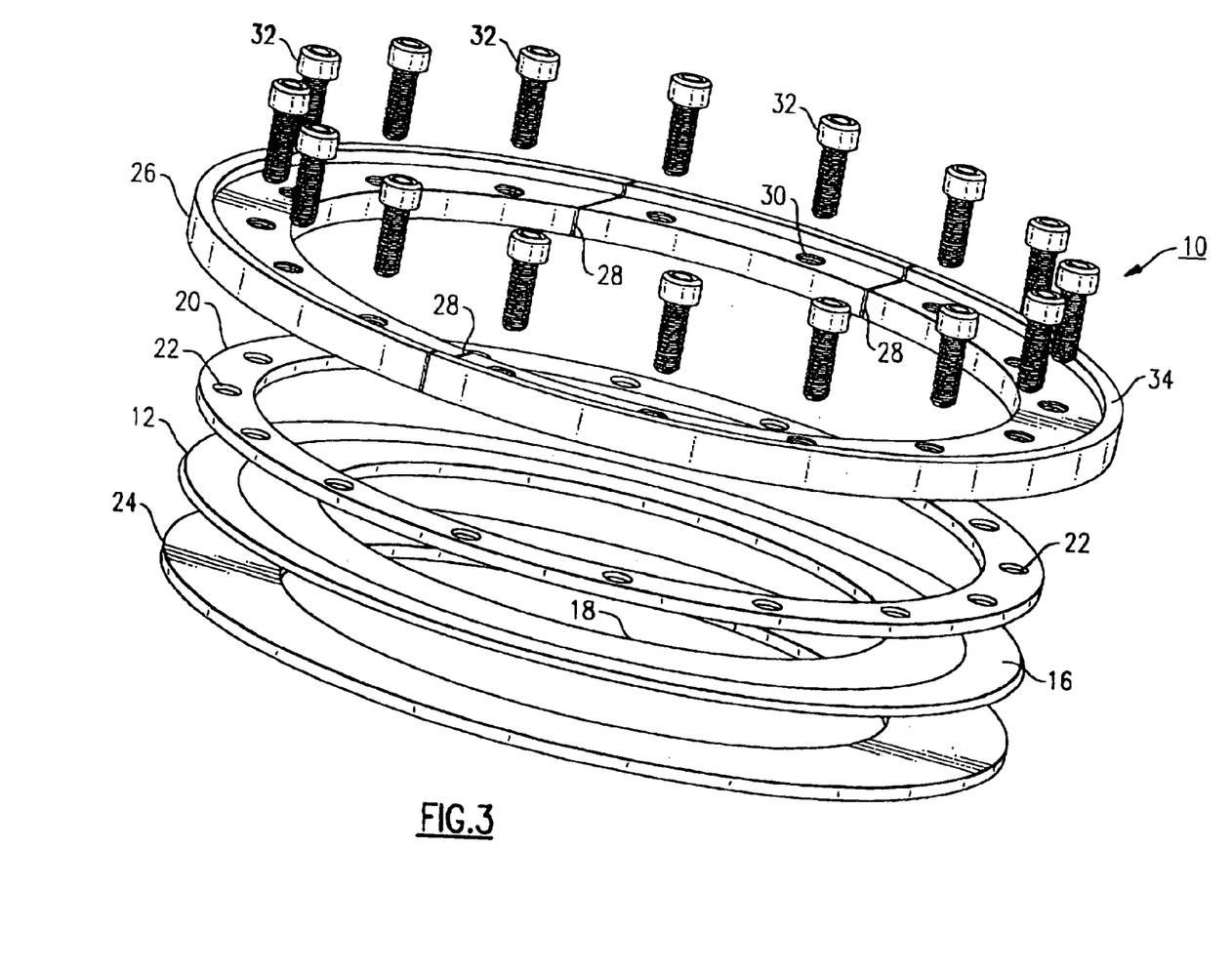
FIG. 3 is an exploded view of the seal assembly of FIG. 1.
Figure 4:
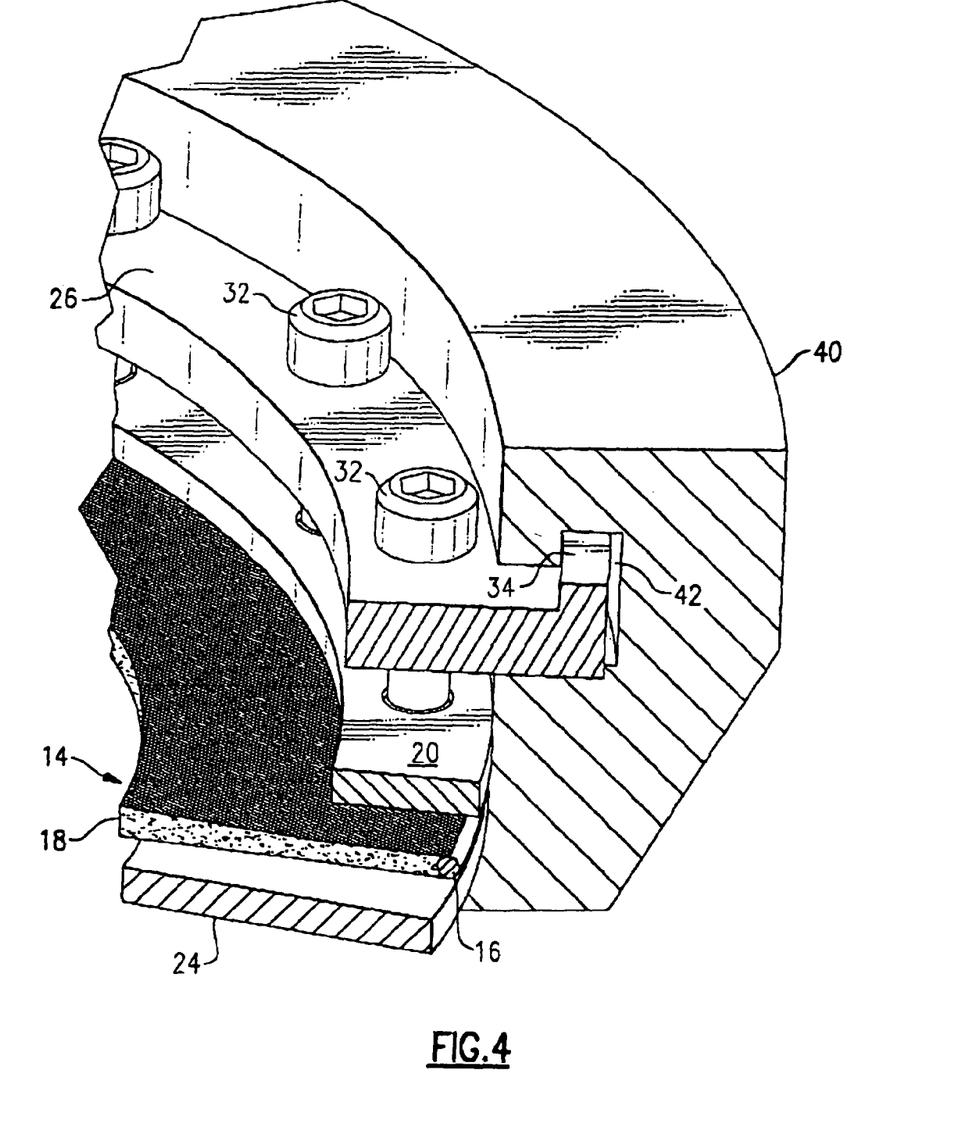
FIG. 4 is a perspective sectional view of the seal assembly of FIG. 1 in place in a support member.

The segmented retaining ring is more clearly illustrated in FIG. 2. FIG. 3 is an exploded view of the seal assembly 10 showing the retaining ring 26, sideplate 20, brush seal 12 and backplate 24. FIG. 4 illustrates a sectional view showing the seal assembly held in place in support member 40.

In addition to the brush seal assembly being in the form of an annular ring, the seal assembly may also comprise a segment of an annular ring or be linear. In these embodiments, the segmented or split ring may be replaced with multiple clamping or retaining members as illustrated hereinafter in FIGS. 5–8.

Figure 5:
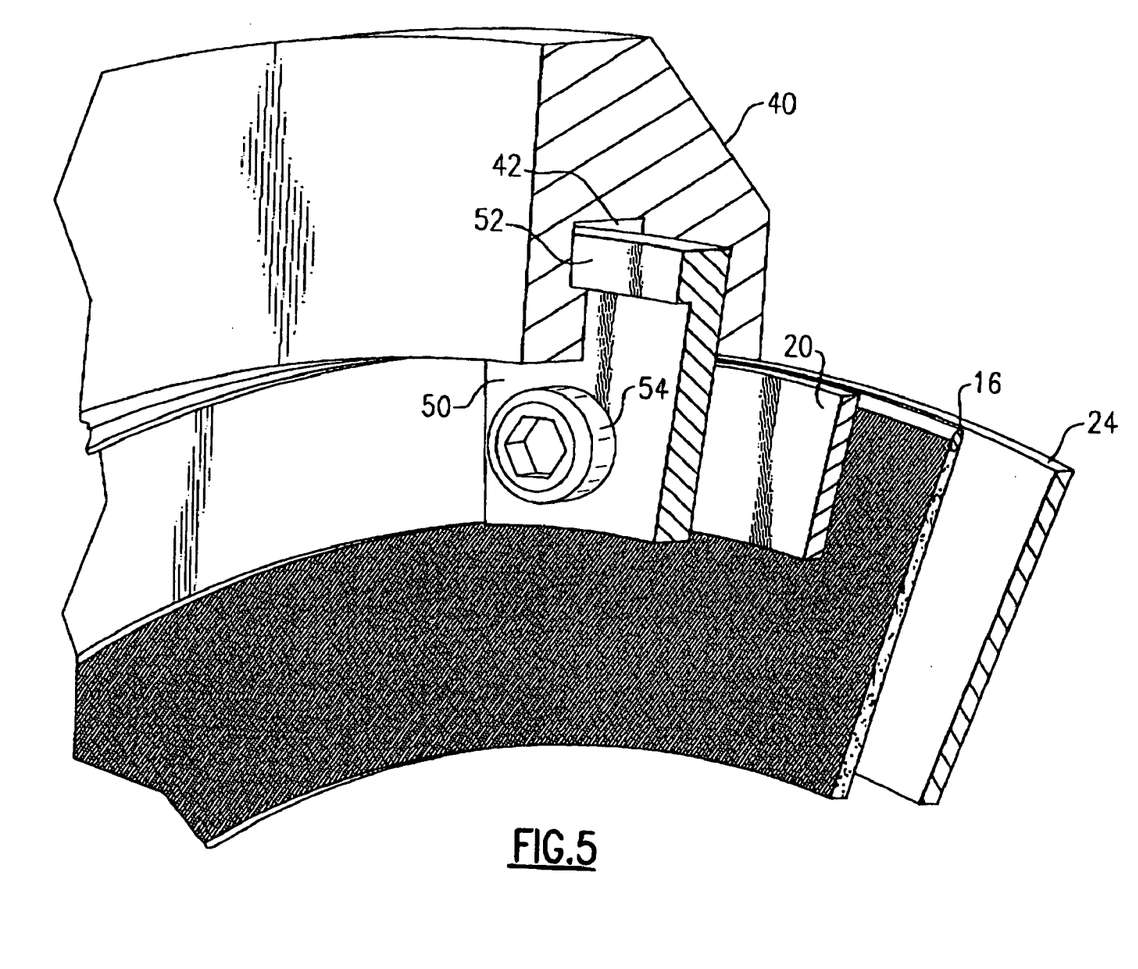
FIG. 5 is a perspective sectional view of an annular seal assembly illustrating one multiple clamping device.

FIG. 5 illustrates an annular seal assembly in which a clamping member 50 is used to hold the brush seal in place in housing 40 through the use of a retention lip 52 which is held in place in slot 42 of support member 40. Clamping bolt 54 functions to hold the brush seal components in place. The drawing illustrates one of multiple clamping members which would be used, depending upon the length of the seal.

Figure 6:
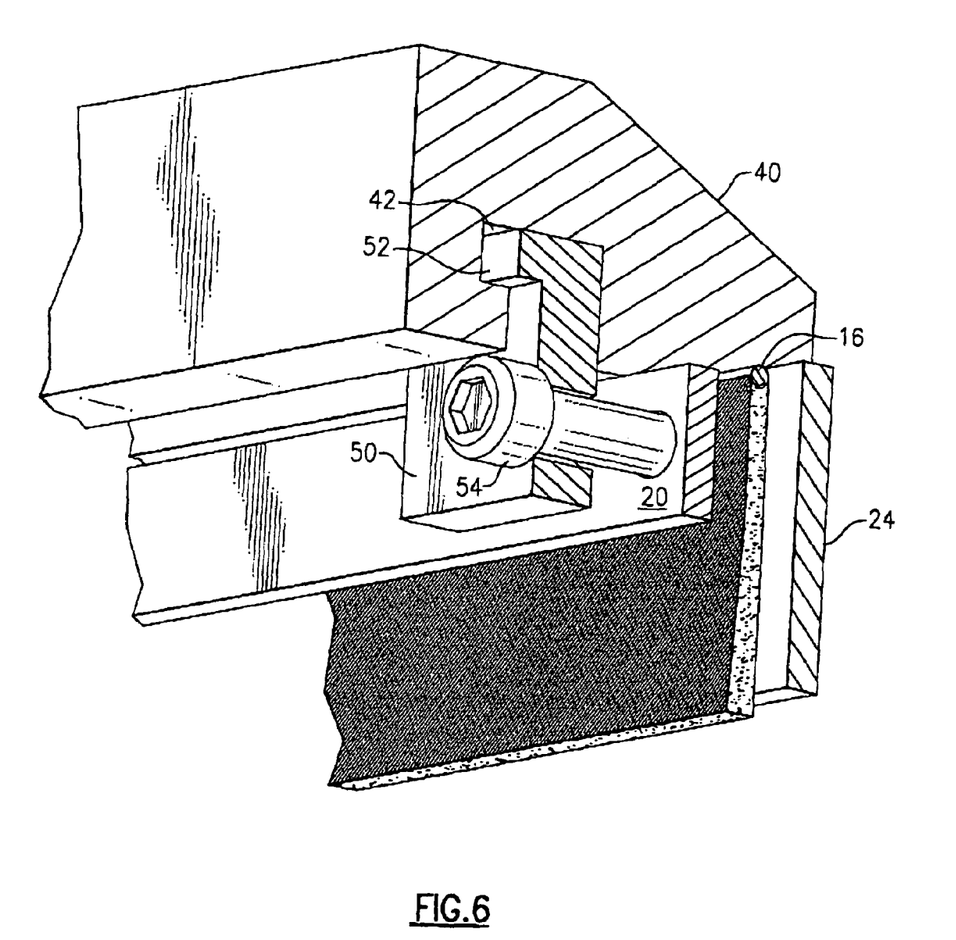
FIG. 6 is a perspective sectional view of a linear seal illustrating one multiple clamping device.
Figure 7:
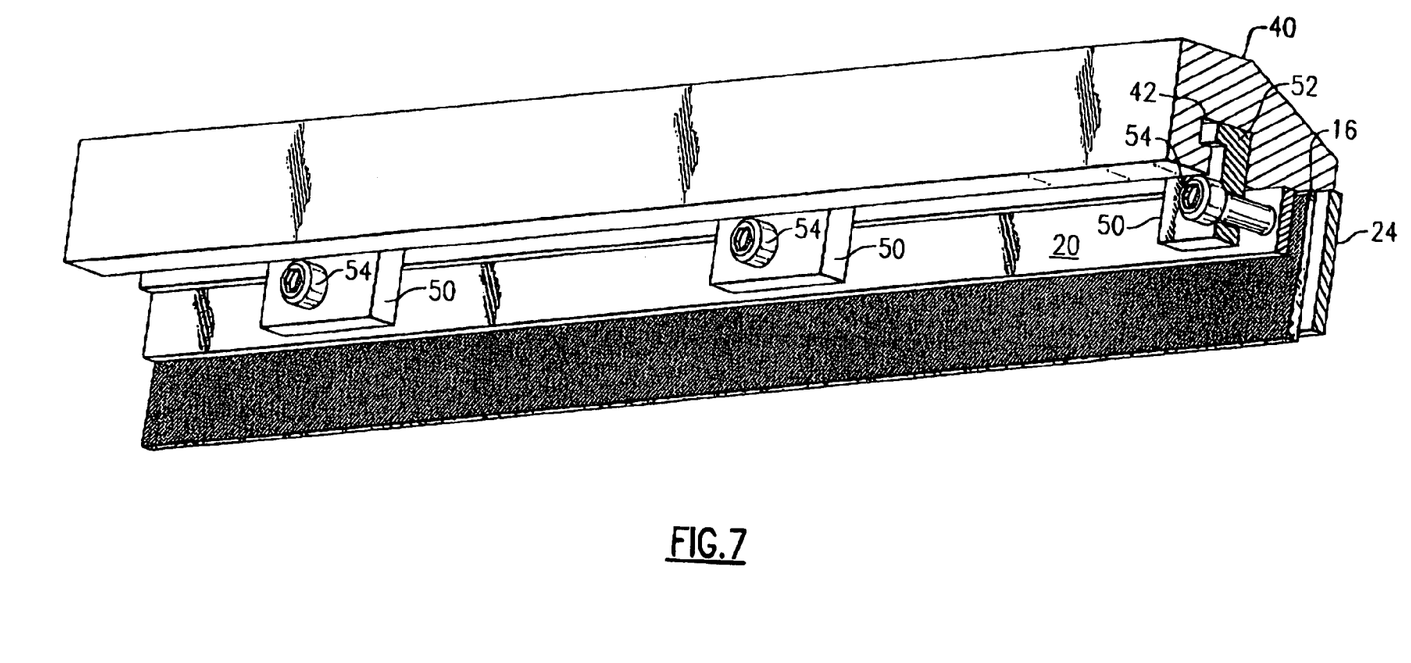
FIG. 7 is a perspective sectional view of a linear seal illustrating multiple clamping devices.

FIG. 6 illustrates a linear seal assembly utilizing the same type of clamping member as that used for the annular seal illustrated in FIG. 5. FIG. 7 illustrates a full length linear seal with multiple clamping members 50 spaced along the length of the seal.

Figure 8:
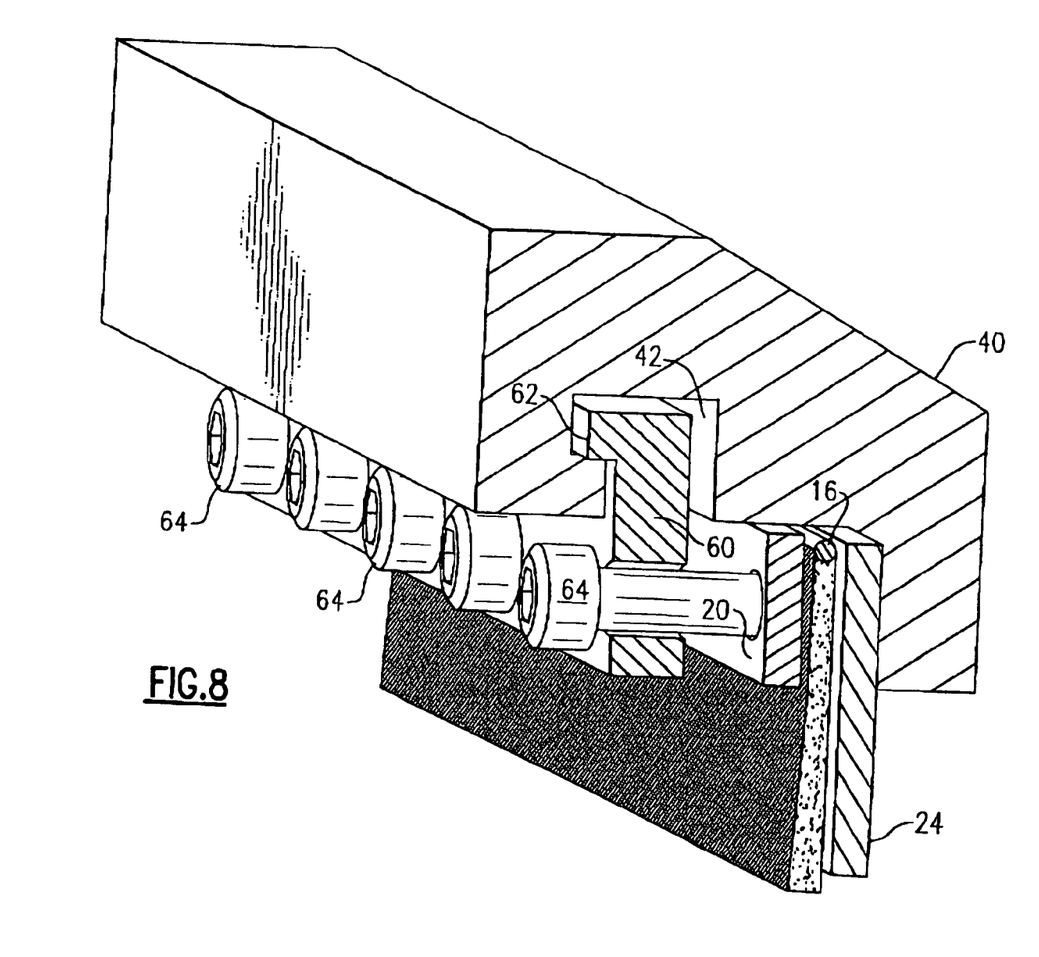
FIG. 8 is a perspective view illustrating a linear seal having a full length clamping device.

FIG. 8 illustrates a linear seal assembly in which a full length clamping member 60 having a retention lip 62 is used to hold the brush seal in place with clamping bolts 64 which are spaced along the length of clamping member 60.

Through the use of the present invention, the seal assembly including the brush seal can be readily disassembled and provides various options and advantages over conventional brush seals.

For example, various brush materials, wire sizes, bore sizes and alloys can be easily tested without the necessity of producing numerous "standalone" seals which is a significant time and cost savings. With the assembly of components being held together mechanically (as opposed to the use of welding to secure the discrete pieces together), no heat treatment is required. Furthermore, brush seals produced by this design can be readily overhauled in the field with a minimum of tools and allow for the replacement of only the worn out or damaged component. Additionally, nonweldable plate materials, such as titanium, could also be used with the design of the present invention.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. A brush seal assembly which comprises:
   (a) a brush seal in the form of a discrete bristle segment in which said bristles are secured at a common end by a weld and discrete flanking plate members; and
   (b) a clamping retaining member which positions and loads said discrete components of said seal in a fixed location within a support member wherein said positioning and loading results in said retainer member and said brush seal being forced apart from each other to create a space therebetween;
   (c) whereby said seal assembly and brush seal may be readily dissembled and said bristle segment replaced.

2. The seal assembly of claim 1 in which said retaining member contains a plurality of fasteners which function to hold said bristle segment and plate members in place in said support member by exerting a force against at least one of said plate members.

3. The seal assembly of claim 2 in which said fasteners contact at least one of said plate members to hold the brush seal in place.

4. The seal assembly of claim 2, wherein at least one of said plate members have recesses therein to accept said fasteners.

5. The seal assembly of claim 1 in which said retaining member contains a retention lip which functions to hold said retaining member in a fixed location within said support member.

6. The seal assembly of claim 1 in which said bristle segment is in the form of a discrete bristle hoop and the retaining member is in the form of a ring.

7. A brush seal assembly and support member which comprises:
   (a) a support member having a first location which positions and loads a brush seal in place and a second location which positions and holds a retaining ring in place;
   (b) a brush seal in the form of a discrete bristle segment in which said bristles are secured at a common end by a weld and discrete plate members, with said seal positioned at said first location in said support member; and
   (c) a retaining member positioned at said second location in said support member wherein said positioning and loading results in said retainer member and said brush seal being forced apart from each other to create a space therebetween;
   (d) whereby said seal assembly and brush seal may be readily dissembled and said bristle segment replaced.

8. The seal assembly of claim 7 in which said retaining member contains a plurality of fasteners which function to hold said bristle segment and plate members in place in said support member by exerting a force against at least one of said plate members.

9. The seal assembly of claim 8 in which said fasteners contact at least one of said plate members to hold the brush seal in place.

10. The seal assembly of claim 8, wherein at least one of said plate members have recesses therein to accept said fasteners.

11. The seal assembly of claim 7 in which said retaining member contains a retention lip which functions to hold said retaining member in a fixed position at said second location within said support member.

12. The seal assembly of claim 7 in which the bristles are in the form of a discrete bristle hoop and the retaining member is in the form of a ring.

13. A brush seal assembly and support member which comprises:
   (a) a support member having a first location which positions and holds a brush seal in place and a second location which positions and holds a retaining ring in place;
   (b) a brush seal in the form of a discrete bristle hoop sandwiched between a discrete backplate member and a discrete sideplate member, in which said bristles are secured at a common end by a weld with said seal positioned at said first location in said support member; and
   (c) a retaining ring positioned at said second location in said support member wherein said positioning and loading results in said retainer member and said brush seal being forced apart from each other to create a space therebetween.

14. A brush seal assembly and support member as set forth in claim 13, wherein said retaining ring contains a plurality of fasteners which function to hold said bristle hoop and plate members in place in said support member by exerting a force against at least one of said plate members.

15. A brush seal assembly and support member as set forth in claim 14, wherein said fasteners contact at least one of said plate members to hold the brush seal in place.

16. A brush seal assembly and support member as set forth in 14 wherein at least one of said plate members have recesses therein to accept said fasteners.

17. A brush seal assembly and support member as set forth in claim 13, wherein said retaining ring contains a retention member which functions to hold said retaining ring in a fixed location within said support member.

* * * * *